United States Patent [19]
Horikawa

[11] Patent Number: 5,860,108
[45] Date of Patent: Jan. 12, 1999

[54] METHOD AND CLUSTERED MULTI-PROCESSOR SYSTEM FOR CONTROLLING A CLOCK PHASE FOR CLUSTERS

[75] Inventor: Koichi Horikawa, Yamanashi, Japan

[73] Assignee: NEC Corporation, Tokyo, Japan

[21] Appl. No.: 635,171

[22] Filed: Apr. 25, 1996

[30] Foreign Application Priority Data

Apr. 26, 1995 [JP] Japan .................................. 7-102532

[51] Int. Cl.$^6$ ........................... G06F 12/00; G06F 13/00
[52] U.S. Cl. .......................... 711/141; 711/118; 711/124; 711/144; 711/147; 711/167; 395/200.43
[58] Field of Search .............................. 395/200.08, 445, 395/468, 471, 474, 550, 730, 200.43; 711/118, 141, 144, 147, 124, 167; 364/DIG. 1

[56] References Cited

U.S. PATENT DOCUMENTS

| | | | |
|---|---|---|---|
| 5,168,547 | 12/1992 | Miller et al. | 395/325 |
| 5,197,130 | 3/1993 | Chen et al. | 395/325 |
| 5,222,229 | 6/1993 | Fukuda et al. | 395/550 |
| 5,394,555 | 2/1995 | Hunter et al. | 395/800 |

FOREIGN PATENT DOCUMENTS

| | | |
|---|---|---|
| 0 603 801 A2 | 6/1994 | European Pat. Off. . |
| 212361 | 1/1990 | Japan . |
| 4291446 | 10/1992 | Japan . |

OTHER PUBLICATIONS

C.K. Tang; "Cache System Design in the Tightly Coupled Multiprocessor System"; National Computer Conference, 1976, pp. 749–753.

D. Lenoski et al.; "Design of Scalable Shared–Memory Multiprocessors: The DASH Approach"; I.E.E.E. (1990) Computer Systems Laboratory, Stanford University, CA pp. 62–67.

Primary Examiner—Tod R. Swann
Assistant Examiner—Tuan V. Thai
Attorney, Agent, or Firm—McGinn & Gibb, P.C.

[57] ABSTRACT

In a clustered multi-processor system and method, first and second clusters are connected between first and second directories. The first directory checks whether an address of a request on a first system bus coincides with an address of a request from the second directory. When the first directory detects the coincidence, the first directory cancels the request on the first system bus, and reissues the request. Since the first system bus and a second system bus have a different clock phase, the requests are checked without overlapping.

21 Claims, 10 Drawing Sheets

RQ (REQUEST) : SYSTEM BUS REQUEST & CANCEL REQUEST
AR0 (ARBITRATION 0) : ARBITRATION WITHIN CLUSTER NOT ISSUE TO SYSTEM BUS
AD0 (ADDRESS 0) : ISSUE REQUEST & UPPER ADDRESS
AD1 (ADDRESS 1) : ISSUE LOWER ADDRESS
AR1 (ARBITRATION 1) : ARBITRATION ACROSS CLUSTER (DETECT CONFLICT)

METHOD AND CLUSTERED MULTI-PROCESSOR SYSTEM FOR CONTROLLING A CLOCK PHASE FOR CLUSTERS

BACKGROUND OF THE INVENTION

The present invention relates to a multi-processor system and method for guaranteeing coherency of cache memories, and more particularly to a method and multi-processor system having clusters each of which have processors and a shared memory.

In a conventional clustered multi-processor system, processors are divided into a plurality of sets called "clusters". Each cluster has at least one processor, at least one cache memory, a shared memory, and a system bus. A cross-bar switch (e.g., a full cross-bar switch) mutually connects the clusters.

In this conventional system, to guarantee coherency of the cache memories (e.g., store-in-caches), a control operation is performed such that the same memory block is not simultaneously copied among a plurality of cache memories.

However, this conventional system has a problem that the hardware amount is increased because two clusters are connected by the cross-bar switch. Moreover, in order to guarantee coherency of the cache memories (e.g., store-in-caches), the memory blocks in the shared memory can be copied by only one of the cache memories at a time. Consequently, a "hit" ratio within the cache memories is lowered, and thus a performance of the overall multi-processor system is lowered.

SUMMARY OF THE INVENTION

In view of the foregoing problems of the conventional system, an object of the present invention is to provide a clustered multi-processor system and method for guaranteeing coherency of cache memories between a plurality of clusters.

In a multi-processor system having clusters according to a first aspect of the present invention, each of the clusters includes at least one processor, at least one cache memory, and a shared memory. The multi-processor system comprises a synchronization controller for shifting clocks of the clusters from one another and a directory for transferring requests and data among the clusters.

With the unique and unobvious structure of the present invention, the system hardware is reduced and the control mechanism is simplified. Thus, a hit ratio within the cache memories and the overall multi-processor or system performance are increased over those of the conventional system.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENT

A clustered multi-processor system and method in accordance with a preferred embodiment of the present invention will be described in detail with reference to the accompanying drawings.

Figure 1:
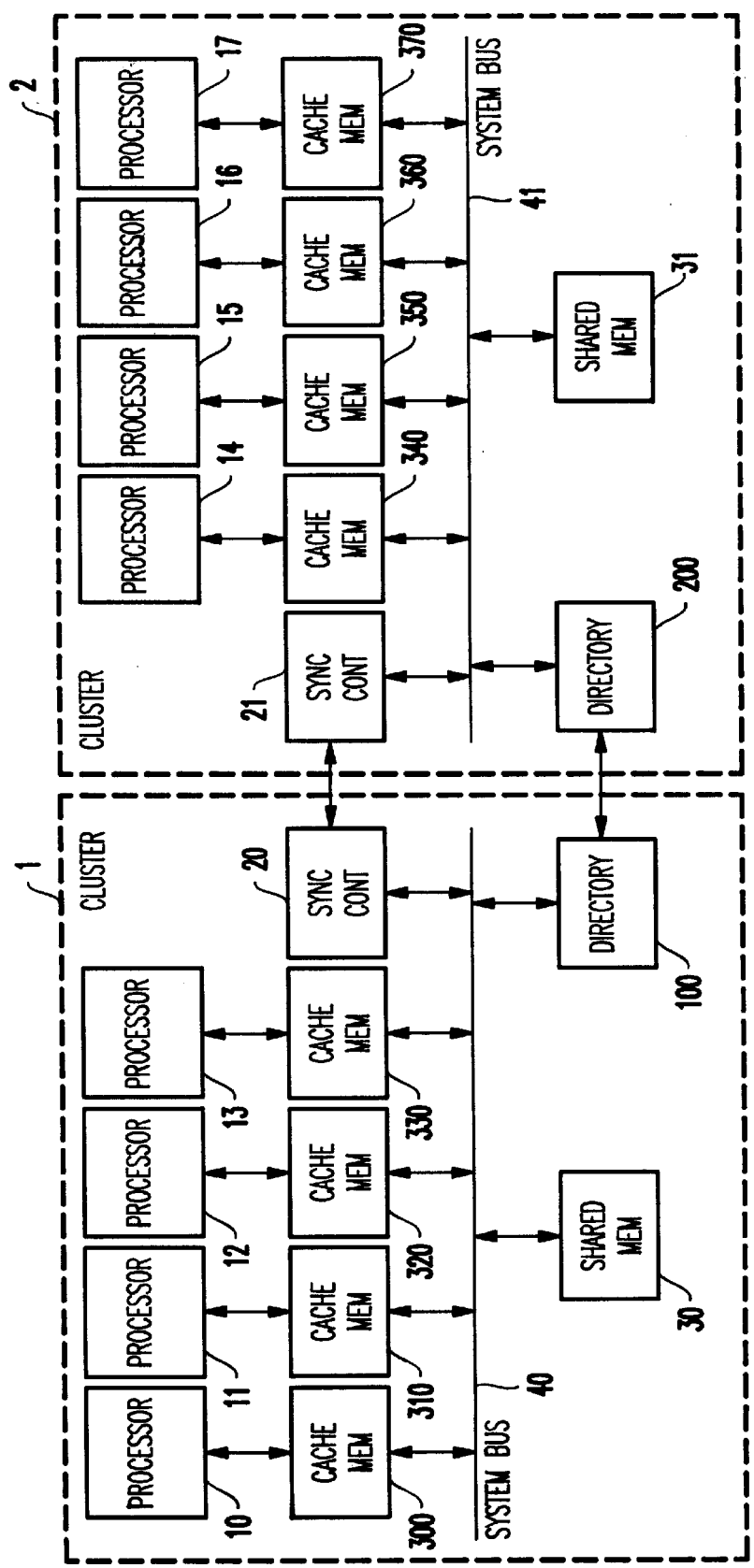
FIG. 1 is a block diagram showing the configuration of a clustered multi-processor system according to a first embodiment of the present invention.

Referring to FIG. 1, a multi-processor system and method according to a first embodiment of the present invention has a plurality (e.g., two) of clusters 1 and 2. The cluster 1 has at least one processor, but commonly a plurality (e.g., four) of processors 10–13. At least one cache memory is provided in the cluster. For example, the processors 10–13 are connected to cache memories 300–330, respectively. The cluster 1 has a synchronization controller 20, a shared memory 30, and a directory 100. A system bus 40 in the cluster 1 connects together the cache memories 300–330, the synchronization controller 20, the shared memory 30, and the directory 100.

The cluster 2 has the same configuration as the cluster 1, i.e., processors 14–17, cache memories 340–370, a synchronization controller 21, a shared memory 31, a directory 200, and a system bus 41.

The shared memories 30 and 31 are accessible from the processors 10–17 through the cache memories 300–370. The synchronization controllers 20 and 21 control the synchronization between the clusters 1 and 2. The directories 100 and 200 of the clusters 1 and 2 respectively store information on blocks copied in the cache memories of the other cluster.

The synchronization controllers 20 and 21 are connected together, and the directories 100 and 200 are connected together.

Figure 2:
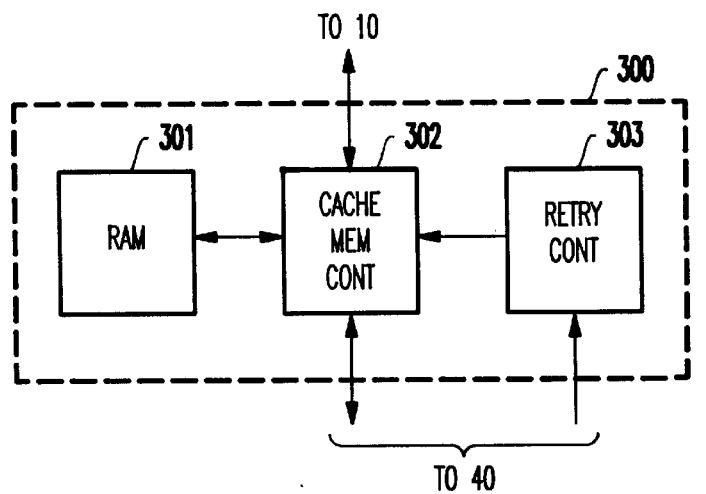
FIG. 2 is a block diagram showing the configuration of a cache memory 300 according to the first embodiment of the present invention.

Referring to FIG. 2, the cache memory 300 has a RAM (random access memory) 301, a cache memory controller 302, and a retry controller 303. The cache memory controller 302 is connected to the processor 10, the RAM 301, the retry controller 303, and the system bus 40. This configuration is similarly found in other cache memories 310–370.

The cache memory controller 302 returns data from the RAM 301 to the processor, updates the RAM 301, and issues a memory block read request to the system bus 40 in response to a data read request or a data write request from the processor 10. That is, a data transfer between the shared memory and the cache memory is executed in block units.

The retry controller 303 instructs the cache memory controller 302 to retry a request when a "cancel" request is issued on the system bus 40. The cache memory controller 302 has a register to store information regarding whether the cache memory 300 issued a request. Thus, the cache memory controller 302 retries the request if the retry controller 303 instructs the cache memory controller 302 to retry and the register in the cache memory controller 302 indicates that the cache memory 300 issued the request.

Each block of the cache memories 300–370 preferably has one of the exemplary states below. In this example, the states are "CE", "CS", "DE", and "IV". The "CE" state indicates "clean exclusive" (i.e., only a single cache memory has a copy of the block, which is not modified). The "CS" state indicates "clean shared" (i.e., a plurality of cache memories may have a copy of the block, which is not modified). The "DE" state indicates "dirty exclusive" (i.e., only a single cache memory has a copy of the block, which is modified). The "IV" state indicates "invalid" (i.e., the block is not registered).

Figure 3:
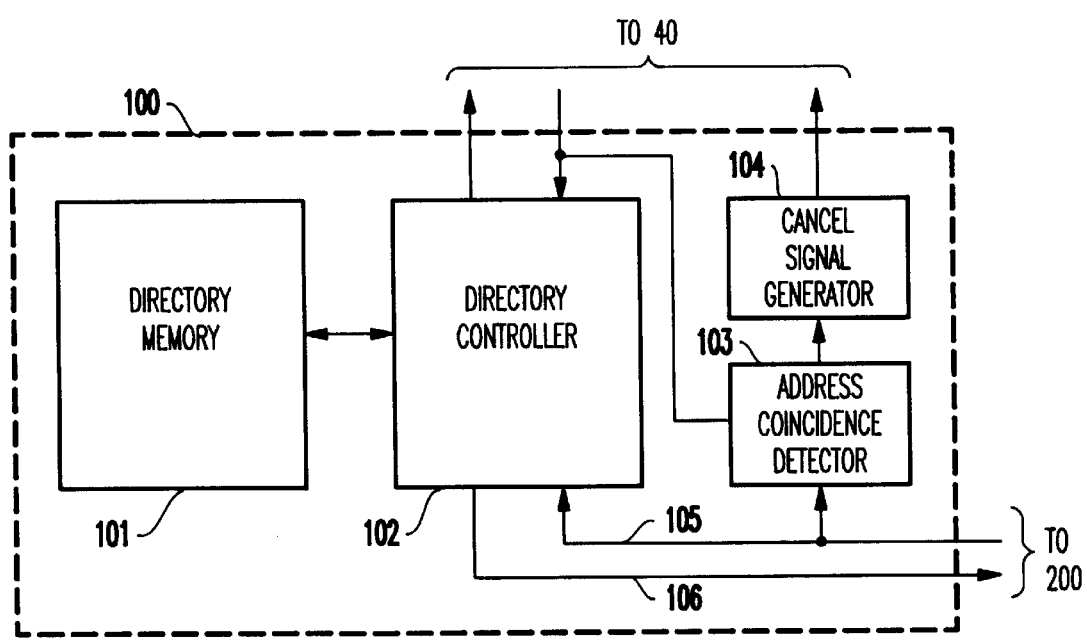
FIG. 3 is a block diagram showing the configuration of a directory 100 according to the first embodiment of the present invention.

Referring to FIG. 3, the directory 100 has a directory memory 101, a directory controller 102, an address coincidence detector 103, and a cancel signal generator 104. The directory controller 102 is connected to the system bus 40, the directory memory 101, and the directory 200. The directory 200 has a similar configuration.

The directory memory 101 stores addresses of blocks of the shared memory 30, which any of the cache memories 340–370 have a copy thereof.

The directory controller 102 monitors the memory block read request issued on the system bus 40, updates information stored in the directory memory 101, and transfers a memory block read request to the directory 200. Conversely, in response to a memory block read request transferred from the directory 200, the directory controller 102 updates information stored in the directory memory 101, and also issues the memory block read request to the system bus 40.

The address coincidence detector 103 detects whether an address of a memory block read request on the system bus 40 is coincident with an address of another memory read request from the directory 200, and, if so, outputs an address coincidence signal to the cancel signal generator 104.

The cancel signal generator 104 issues a "cancel" signal on the system bus 40 in response to the output (e.g., a coincidence signal) sent from the address coincidence detector 103.

Figure 4:
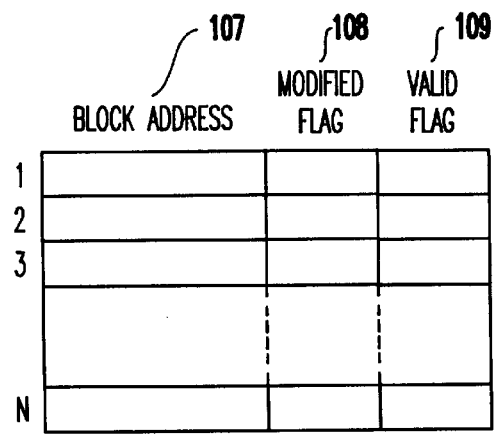
FIG. 4 is a format of a directory memory 101 according to the first embodiment of the present invention.

Referring to FIG. 4, a directory memory 101 has a plurality (e.g., N, where N is a positive integer) of entries. Each entry stores a block address 107, a modified flag 108, and a valid flag 109. The block address 107 indicates an address of a block which is assigned to the shared memory 30 and is copied in any one of the cache memories 340–370 in the cluster 2.

The modified flag 108 indicates whether the block is modified by any one of the cache memories 340–370 in the cluster 2. If the modified flag is set to "modified" (e.g., "1"), then the block address of the entry has been modified. The valid flag 109 indicates whether the respective entry is valid. If the valid flag is set to "invalid" (e.g., "0"), then the block address of the entry is invalid.

Figure 5:
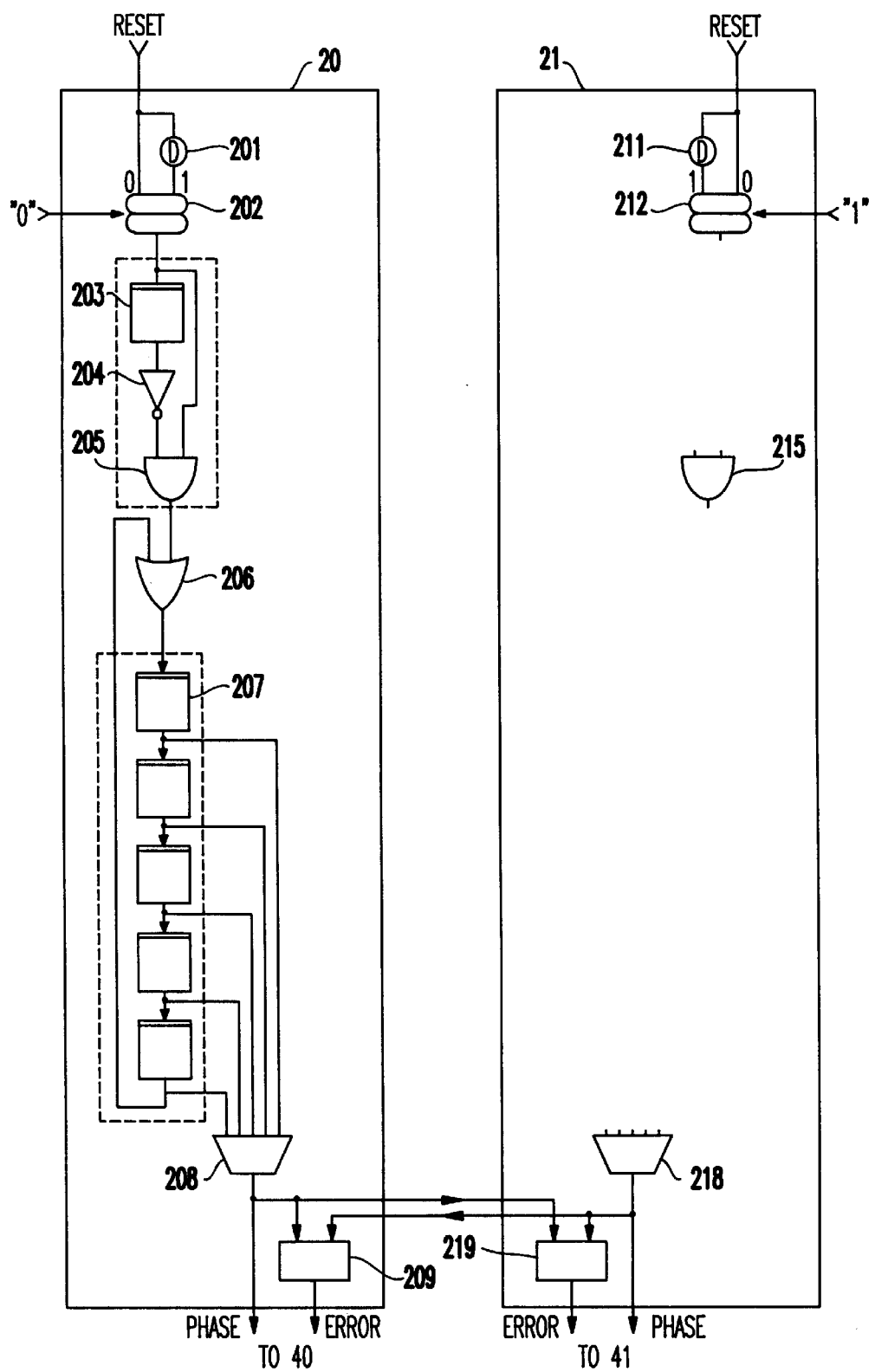
FIG. 5 is a block diagram showing the configuration of a synchronization controllers 20 and 21 according to the first embodiment of the present invention.

Referring to FIG. 5, the synchronization controller 20 has a delay circuit 201, a selector 202, a flip-flop 203, an inverter 204, an AND gate 205, an OR gate 206, a plurality of serially-connected flip-flops 207, an encoder 208, and a synchronization check circuit 209. The synchronization controller 21 has a similar configuration including a delay circuit 211, a selector 212, a flip-flop 213, an inverter 214, an AND gate 215, an OR gate 216, serially-connected flip-flops 217, an encoder 218, and a synchronization check circuit 219.

The delay circuit 201 generates a delayed signal by 2.5 clocks. The selector 202 selects one of a "RESET" signal and the delayed signal depending on a clamped signal input thereto from a clamped signal generator (unreferenced). In the synchronization controller 20, the clamped signal (e.g., "0") instructs the selector 202 to select the "RESET" signal.

The flip-flop 203, the inverter 204, and the AND gate 205 in combination function as a differential circuit. Each of the flip-flops 207 holds an input signal clock-by-clock. Thus, the flip-flops 207 in combination function as a counter. The OR gate 206 performs a logical OR operation between an output of the AND gate 205 and an output of the last one of the flip-flops 207.

The encoder 208 encodes outputs of each of the flip-flops 207. An output of the encoder 208 indicates a phase of the system bus 40, and is supplied to the system bus 40, and to the synchronization check circuits 209 and 219.

The synchronization check circuit 209 compares the output (e.g., the phase) of the encoder 208 with an output (e.g., the phase) of the encoder 218. When a difference between the phases of the system buses 40 and 41 is not 2.5 clocks (e.g., not a 2.5 phase), the synchronization check circuit 209 outputs an error signal.

Figure 6:
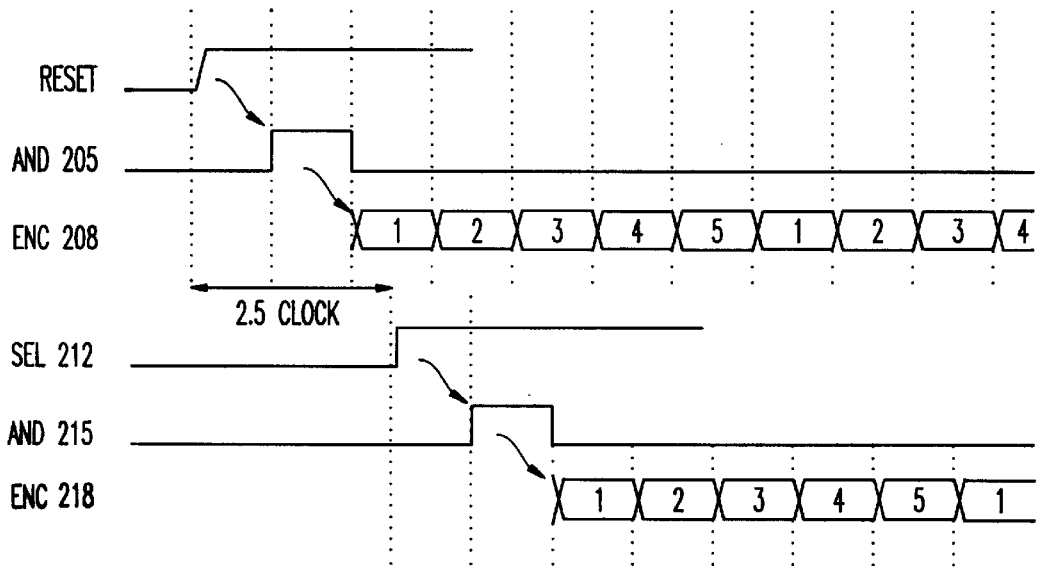
FIG. 6 is a timing chart of synchronization controllers 20 and 21 according to the first embodiment of the present invention.

Referring to FIG. 6, a clock of the cluster 1 is shifted by a half clock from a clock of the cluster 2. In response to the RESET signal, the AND gate 205 outputs one clock pulse. Then, each of the flip-flops 207 holds the pulse one-by-one. The encoder 208 outputs the phase of the system bus 40.

In response to the RESET signal, the delay circuit 211 outputs a delayed RESET signal by 2.5 clocks (e.g., a 2.5 phase). The AND gate 215 outputs one clock pulse. The encoder 218 outputs the phase of the system bus 41.

Figure 7:
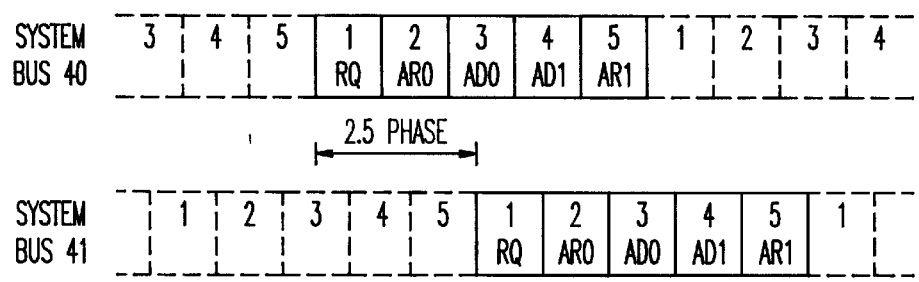
FIG. 7 is a timing chart of system buses 40 and 41 according to the first embodiment of the present invention.

Referring to FIG. 7, one transaction of the system buses 40 and 41 has five phases (i.e., "RQ", "AR0", "AD0", "AD1", and "AR1").

In the "RQ" (request) phase, the system bus is requested for access (e.g., access to the shared memory). In the "AR0" (arbitration 0) phase, one of the cache memories for issuing an access request (e.g., a memory read request) is selected in the cluster. In the "AD0" (address 0) phase, the selected cache memory issues the access request and an upper address. In the "AD1" (address 1) phase, the selected cache memory issues a lower address. In the "AR1" (arbitration 1) phase, the directory detects whether a conflict exists between the clusters 1 and 2. The directory issues a cancel request in the next "RQ" phase if the conflict is detected in the "AR1" phase.

The system buses 40 and 41 are controlled such that synchronizing operations thereof are shifted from each other. In this embodiment, the synchronizing operations are shifted by a 2.5 phase. That is, the "RQ" phase of the system bus 40 occurs between the "AD0" and "AD1" phases of the system bus 41.

Hereinbelow and referring to FIGS. 1–13, the operation of the multi-processor system in accordance with the above-mentioned embodiment of the present invention will be described.

For ease of discussion, the following description assumes that the processor 10 in the cluster 1 issues a data read/write request. This description is equally applicable to when one of the other processors 11–17 issues a data read/write request.

In FIGS. 8–13, "LOCAL CACHE" or "LOCAL" corresponds to the cache memory 300, "OTHER CACHE" or "OTHER" corresponds to the cache memories 310–330, "REMOTE" corresponds to the cache memories 340–370, "LOCAL MEM" or "MEM" corresponds to the shared memory 30, "REMOTE MEM" corresponds to the shared memory 31, "MDL" indicates the modified flag in the directory 100, "MDR" indicates the modified flag in the directory 200, "VDL" indicates the valid flag in the directory 100, and "VDR" indicates the valid flag in the directory 200.

First, a read operation for data assigned to the shared memory 30 (i.e., the local memory) in the cluster 1 is described.

Figure 8:
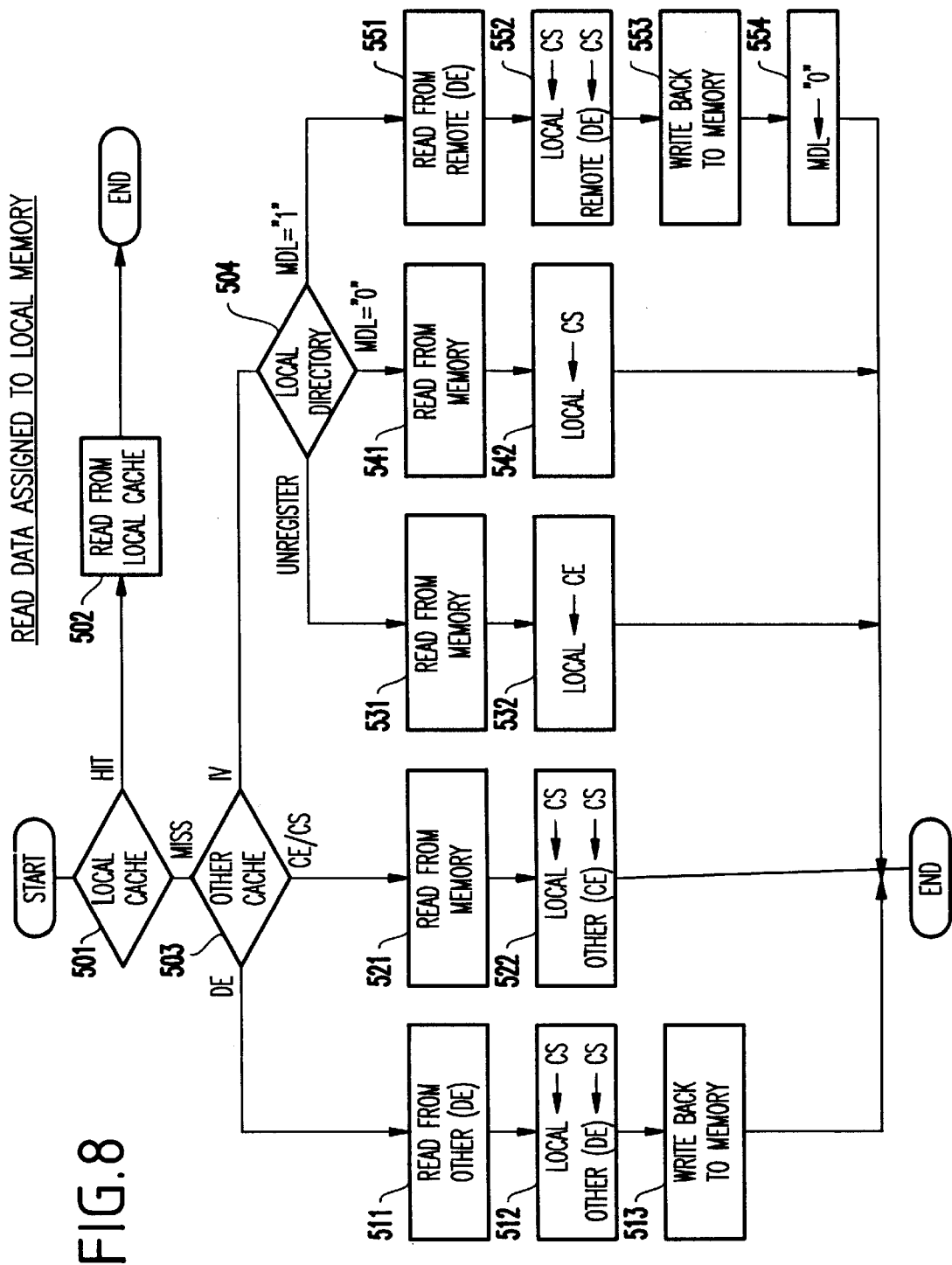
FIG. 8 is a flowchart showing an operation for reading data assigned to a local shared memory in the clustered multi-processor system according to the first embodiment of the present invention.

Referring to FIG. 8, when the data is copied (i.e., a "HIT") in the cache memory 300 (i.e., the local cache), the data is read from the cache memory 300 (e.g., in steps 501–502) and the operation terminates.

When the data is not copied (i.e., a "MISS") in the cache memory 300, the cache memory control circuit 302 issues a system bus request at the "RQ" phase of the system bus 40. When the system bus 40 is acquired, the cache memory control circuit 302 issues a "shared block read request" (hereinafter referred to as an "SBR") at the "AD0" and "AD1" phase of the system bus 40. The SBR is a block read request and is used for accessing the block without a write operation. Hereafter, a similar operation will be carried out when the cache memory subsequently issues further requests to the system bus. For brevity, further description is omitted. In response to the SBR, other cache memories 310–330 in the cluster 1 are checked (in step 503).

When one of the cache memories 310–330 has a state of "DE" in step 503, a block including the requested data is read from the cache memory with the "DE" state (in step 511). The state of the cache memory 300 and the cache memory with the "DE" state become "CS" (in step 512). The block is sent to the cache memory 300 and the shared memory 30 (in step 513).

When any of the cache memories 310–330 have a state of "CE" or "CS" in step 503, the block including the requested data is read from the shared memory 30 (in step 521). The block is sent to the cache memory 300. The state of the cache memory 300 and the cache memory with the "CE" state become "CS" (in step 522).

When none of the cache memories 310–330 has a copy of the block including the requested data, the directory 100 checks whether the block is registered in the local memory (e.g., the directory memory 101) in step 504.

If the block is not registered in the directory memory 101 in step 504, the block is read from the shared memory 30 (in step 531). Then, the block is registered in the cache memory 300 with the state of "CE" (in step 532).

If the block is registered in the directory memory 101 and the modified flag 108 indicates that the block is "not modified" (e.g., "0") in step 504, the block is read from the shared memory 30 (in step 541). The block is registered in the cache memory 300 with the state of "CS" (in step 542).

If the block is registered in the directory memory 101 and the modified flag 108 indicates that the block is "modified" (e.g., "1") in step 504, the block is read from the cache memory with the "DE" state from the cluster 2 (in step 551). The block is registered in the cache memory 300 with the state of "CS" (in step 552). The state of the cache memory with the "DE" state becomes "CS" (in step 552). The block is sent to the shared memory 30 (in step 553). The modified flag of the block in the directory 100 becomes "not modified" (e.g., "0") in step 554.

Second, a read operation for data assigned to the shared memory 31 (i.e., a remote memory) in the cluster 2 is described.

Figure 9:
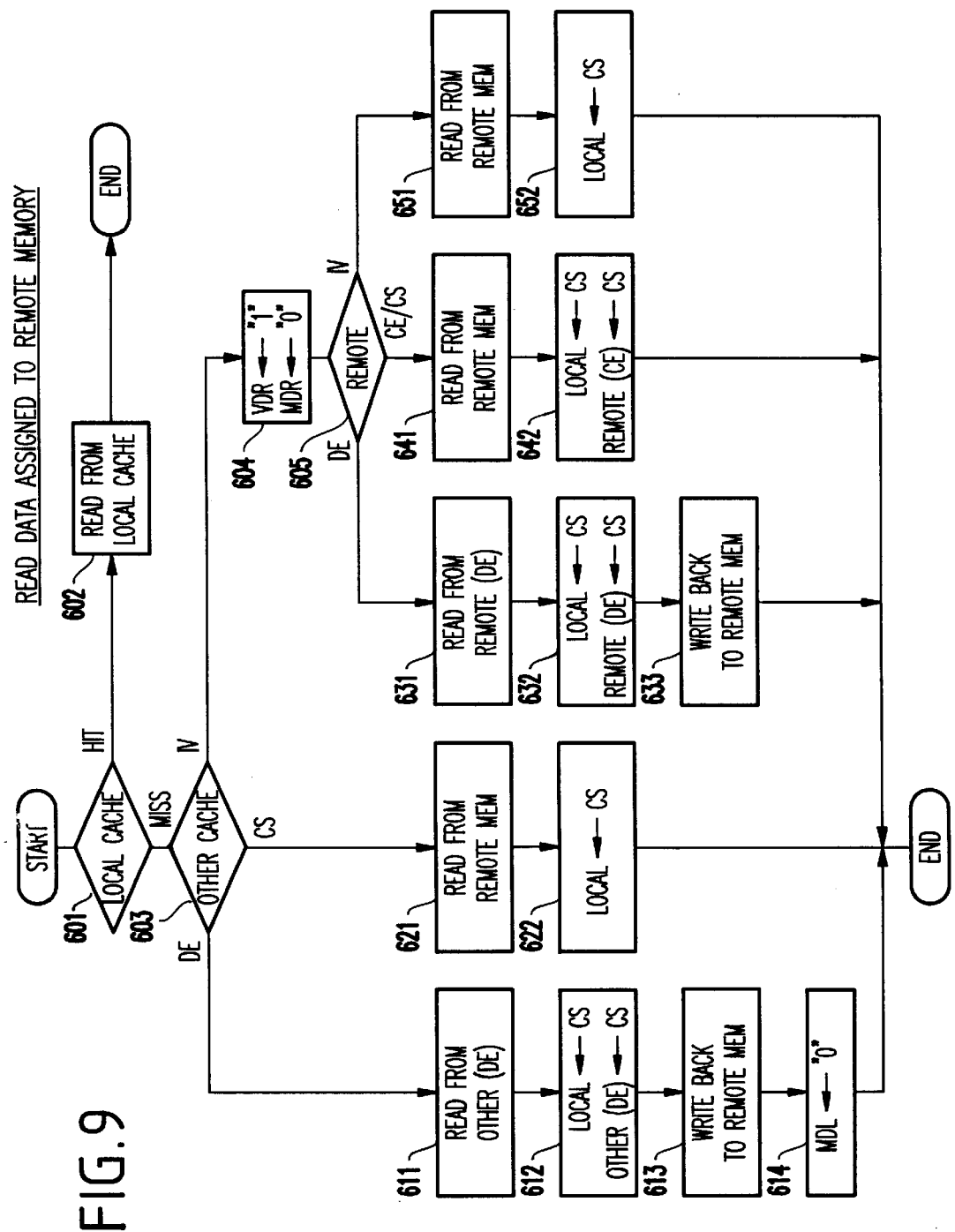
FIG. 9 is a flowchart showing an operation for reading data assigned to a remote shared memory in the clustered multi-processor system according to the first embodiment of the present invention.

Referring to FIG. 9, when the data is copied (i.e., a "HIT") in the cache memory 300 (i.e., the local cache), the data is read from the cache memory 300 (in steps 601–602) and the operation terminates.

When the data is not copied (i.e., a "MISS") in the cache memory 300, the cache memory control circuit 302 issues a system bus request at the "RQ" phase of the system bus 40. When the system bus 40 is acquired, the cache memory control circuit 302 issues an "SBR" at the "AD0" and "AD1" phase of the system bus 40. In response to the SBR, other cache memories 310–330 in the cluster 1 are checked (in step 603).

When one of the cache memories 310–330 has a state of "DE" in step 603, a block including the requested data is read from the cache memory with the "DE" state (in step 611). The state of the cache memory 300 and the cache memory with the "DE" state become "CS" (in step 612). The block is sent to the cache memory 300 and the shared memory 31 (in step 613). In step 614, the modified flag in directory 200 is set to "0".

When any of the cache memories 310–330 have a state of "CS" in step 603, the block including the requested data is read from the shared memory 31 (in step 621), and is sent to the cache memory 300. The state of the cache memory 300 become "CS" (in step 622).

When none of the cache memories 310–330 has a copy of the block including the requested data, the directory 200 registers an address of the block (e.g., sets the valid flag of the block to "1") with "not modified" (e.g., sets the modified flag of the block to "0") in step 604. Thereafter, the cache memories 340–370 in the cluster 2 (e.g., the remote cluster) are checked (in step 605).

When one of the cache memories 340–370 (e.g., remote cache memories) has a state of "DE" in step 605, a block including the requested data is read from the cache memory with the "DE" state (in step 631). The state of the cache memory 300 and the cache memory with the "DE" state become "CS" (in step 632). The block is sent to the cache memory 300 and the shared memory 31 (in step 633).

When any of the cache memories 340–370 have a state of "CE" or "CS" in step 605, the block including the requested data is read from the shared memory (remote) 31 (in step 641). The block is sent to the cache memory 300. The state of the cache memory 300 and the cache memory with the "CE" state become "CS" (in step 642).

When none of the cache memories 340–370 has a copy of the block including the requested data, the block including the requested data is read from the shared memory (remote) 31 (in step 651), and is registered in the cache memory 300 with the state of "CS" (in step 652).

Third, a write operation for data assigned to the shared memory 30 (i.e., the local memory) in the cluster 1 is described.

Figure 10:
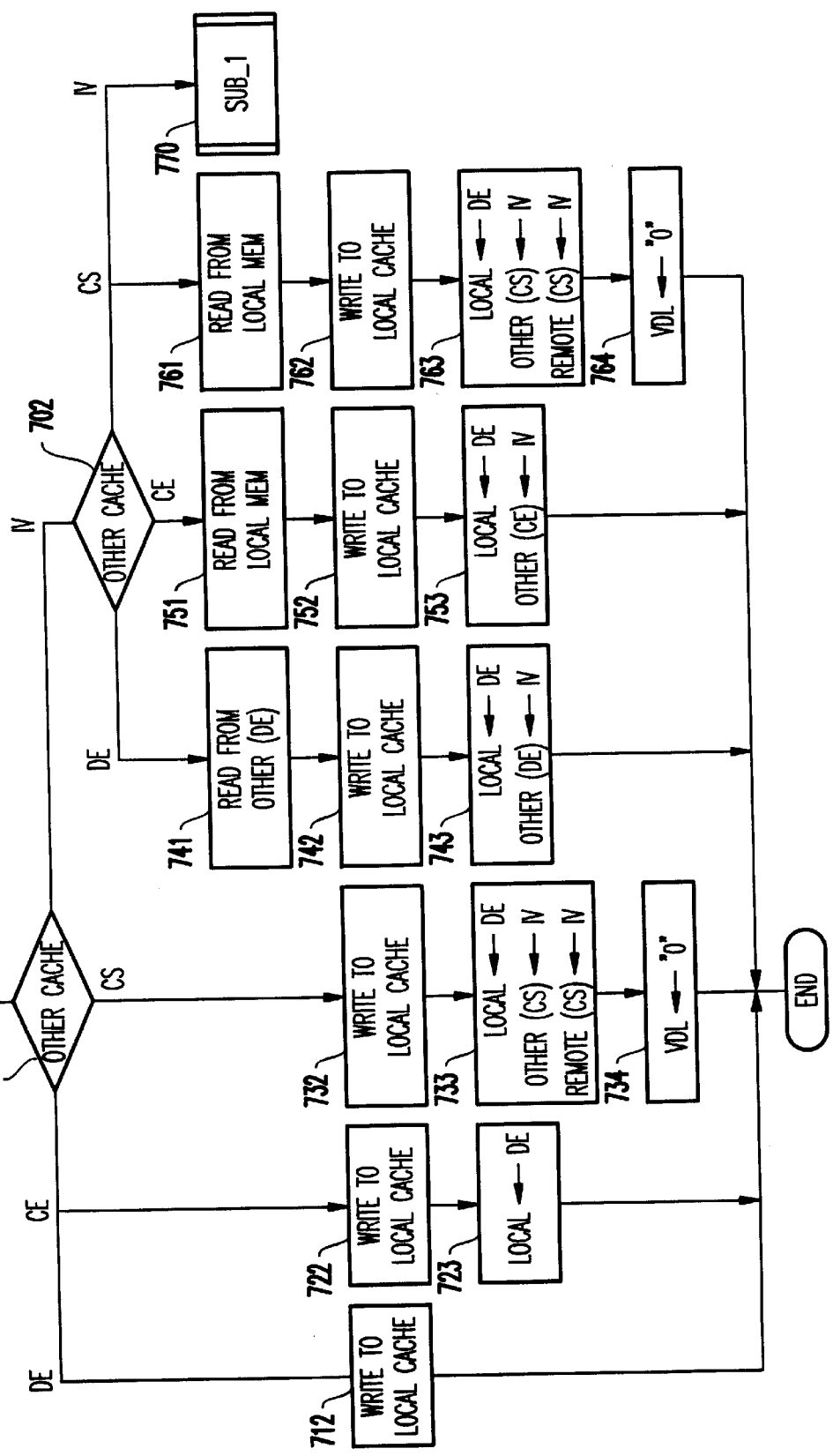
FIG. 10 is a flowchart showing an entire operation for writing data assigned to a local shared memory in the clustered multi-processor system according to the first embodiment of the present invention.

Referring to FIG. 10, first the state of the cache memory (local) 300 is checked (in step 701).

When the cache memory 300 has a state of "DE" in step 701, the data is written to the cache memory 300 (in step 712).

When the cache memory 300 has a state of "CE" in step 701, the data is written to the cache memory 300 (in step 722). Thereafter, the state of the cache memory 300 becomes "DE" (in step 723).

When the cache memory 300 has a state of "CS" in step 701, the data is written to the cache memory 300 (in step 732). The state of the cache memory 300 becomes "DE" (in step 733). The cache memory 300 issues a "memory block invalidation request" (hereafter referred to as an "INV") to the system bus 40. The "INV" is used for invalidation of a block in other cache memories.

Specifically, if any of the other cache memories 310–330 in the cluster 1 have a copy of the block with the "CS" state, then the status of the cache memory with the "CS" state becomes "IV" (i.e., invalidated) in step 733. When the modified flag indicates the block is "not modified" (e.g., "0") in the directory 100, the directory 100 invalidates the entry of the block (e.g., sets the valid flag to "0") in step 734. The directory 100 further transfers the "INV" to the directory 200. The directory 200 issues the "INV" to the system bus 41. When any of the cache memories 340–370 in the cluster 2 have a copy of the block with "CS", then the status of the cache memory (memories) with "CS" becomes "IV" (in step 733).

When the cache memory 300 does not have a copy of the block including the requested data in step 701, the cache memory 300 issues an "exclusive block read request" (hereafter referred to as an "EBR") at the "AD0" and "AD1" phase of the system bus 40. The EBR is a block read request and is used for accessing the block with a write operation. In response to the "EBR", the state of the cache memories 310–330 in the cluster 1 is checked (in step 702).

When one of the cache memories 310–330 has a state of "DE" in step 702, the block is read from the cache memory with "DE" (in step 741). The block is sent to the cache memory 300. Thereafter, the data is written to the cache memory 300 (in step 742). In step 743, the state of the cache memory 300 becomes "DE", and the state of the cache memory with "DE" becomes "IV".

When any of the cache memories 310–330 have a state of "CE" in step 702, the block is read from the shared memory 30 (in step 751). The block is sent to the cache memory 300. Thereafter, the data is written to the cache memory 300 (in step 752). In step 753, the state of the cache memory (local) 300 becomes "DE" and the state of the cache memory with the "CE" state becomes "IV".

When any of the cache memories 310–330 have a state of "CS" in step 702, the block is read from the shared memory 30 (in step 761). The block is sent to the cache memory 300. Thereafter, the data is written to the cache memory 300 (in step 762). In step 763, the state of the cache memory 300 becomes "DE" and the state of the cache memory with the "CS" state becomes "IV". The directory 100 retrieves the directory memory 101.

When the modified flag of the block is registered as "0", the directory 100 invalidates the block (e.g., sets the valid flag to "0") (in step 764). Then, the directory 100 transfers the "INV" to the directory 200. The directory 200 issues the "INV" to the system bus 41. When any of the cache memories 340–370 of the cluster 2 have a copy of the block with the "CS" state, the state of the cache memory with the "CS" state becomes "IV" (in step 763).

Figure 11:
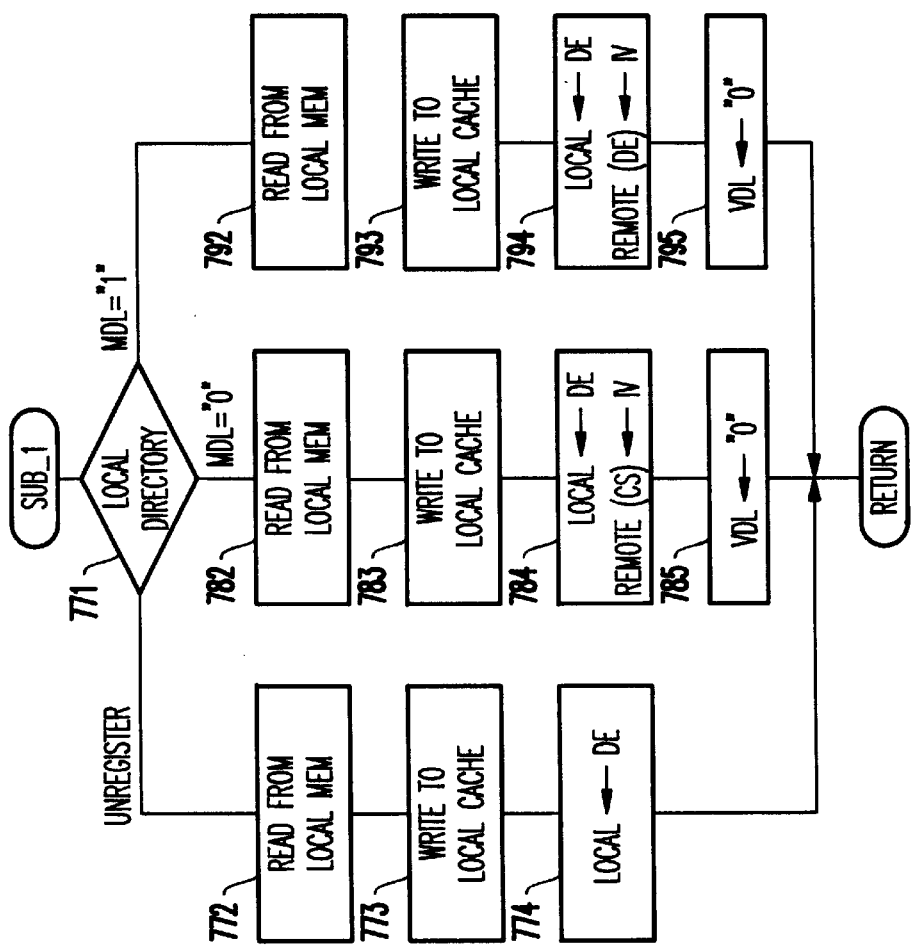
FIG. 11 is a flowchart showing an operation for writing data assigned to a local shared memory in the clustered multi-processor system according to the first embodiment of the present invention, when the data is not copied by any cache memories.

When none of the cache memories 310–330 has a copy of the block in step 702, in step 770 the operation (SUB_1), described in further detail below with regard to FIG. 11, is executed.

Referring to FIG. 11, the directory 100 checks whether the block is registered in the directory memory 101 (in step 771).

If the block is not registered in the directory memory 101 in step 771, the block is read from the shared memory 30 (in step 772). The block is sent to the cache memory 300.

Thereafter, the data is written to the cache memory 300 (in step 773). The block is registered in the cache memory 300 with the state of "DE" (in step 774).

If the block is registered in the directory memory 101 and the modified flag 108 is "not modified" (e.g., "0") in step 771, the block is read from the shared memory 30 (in step 782). The block is sent to the cache memory 300.

Thereafter, the data is written to the cache memory 300 (in step 783). The block is registered in the cache memory 300 with the state of "DE" (in step 784. When any of the cache memories 340–370 of the cluster 2 have a copy of the block with the "CS" state, the state of the block with the "CS" state becomes "IV" (in step 784). The directory 100 invalidates the block (e.g., sets the valid flag to "0") in step 785.

If the block is registered in the directory memory 101 and the modified flag 108 indicates the block is "modified" (e.g., "1") in step 771, the block is read from the cache memory with the "DE" state (in step 792). The block is sent to the cache memory (local) 300. Thereafter, the data is written to the cache memory 300 (in step 793). In step 794, the block is registered in the cache memory 300 with the state of "DE", and the state of the block with the "DE" state becomes "IV". The directory 100 invalidates the block (e.g., sets the valid flag to "0") in step 795.

Figure 12:
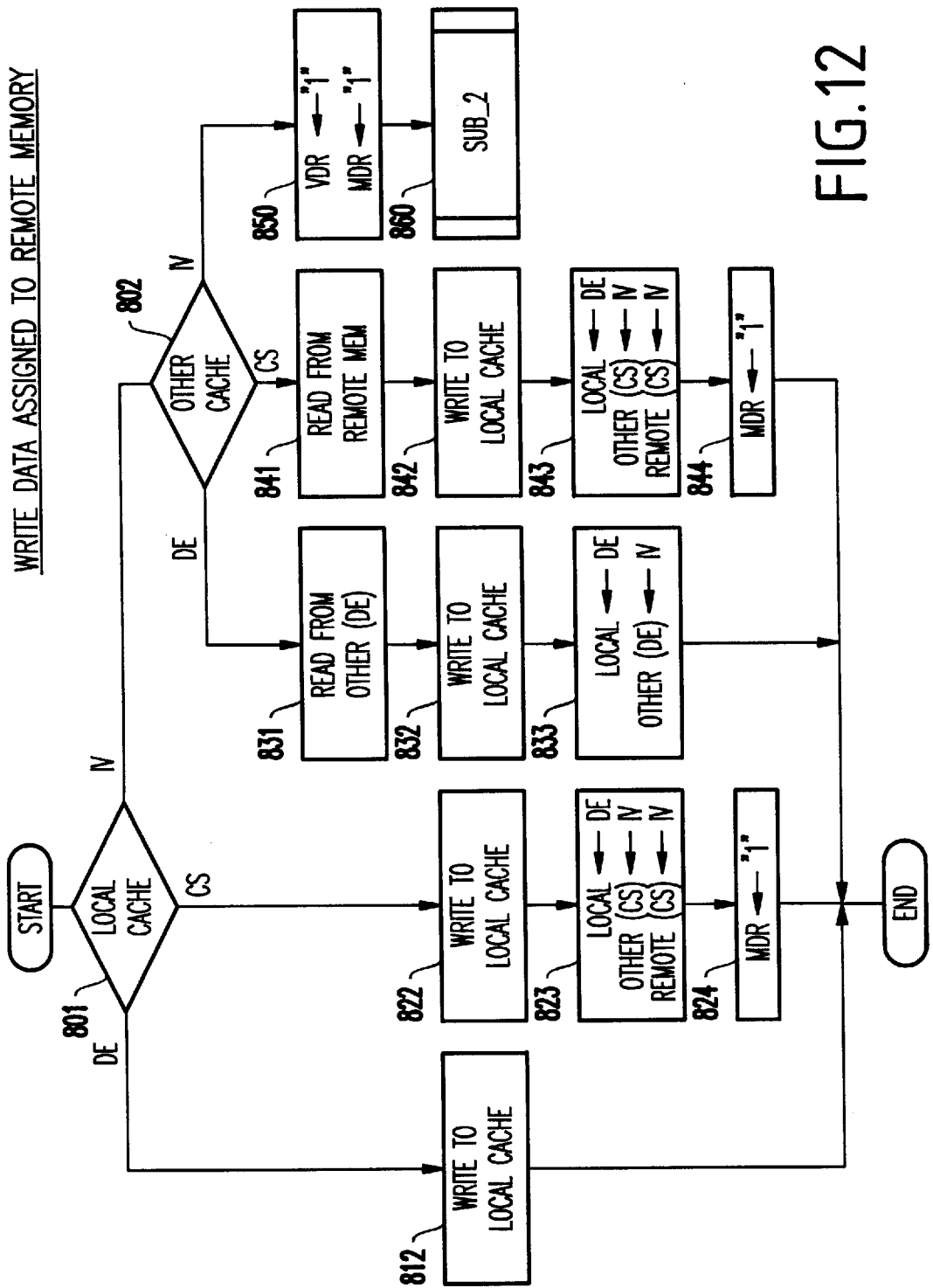
FIG. 12 is a flowchart showing an entire operation for writing data assigned to the remote shared memory in the clustered multi-processor system according to the first embodiment of the present invention.

Fourth, referring to FIG. 12, a write operation for data assigned to the shared memory 31 (i.e., a remote memory) in the cluster 2 is described.

First, the state of the cache memory 300 is checked (in step 801).

When the cache memory 300 has a state of "DE" in step 801, the data is written to the cache memory 300 (in step 812) and the operation is completed.

When the cache memory 300 has a state of "CS" in step 801, the data is written to the cache memory 300 (in step 822). In step 823 the state of the cache memory 300 becomes "DE", and if any of the cache memories 310–370 have a block with the "CS" state, then the state of the block with the "CS" state becomes "IV". The modified flag of the block in the directory 200 (remote directory) becomes the "modified" status (e.g., "1") (in step 824).

When the cache memory 300 does not have a copy of the block including the requested data in step 801, the cache memory 300 issues an "EBR". In response to the "EBR", the states of the cache memories 310–330 in the cluster 1 are checked (in step 802).

When one of the cache memories 310–330 has a state of "DE" in step 802, the block is read from the cache memory with the "DE" state (in step 831), and is sent to the cache memory 300. Thereafter, the data is written to the cache memory 300 (in step 832). Finally, in step 833 the state of the cache memory 300 becomes "DE" and the state of the cache memory with the "DE" state becomes "IV".

When any of the cache memories 310–330 have a state of "CS" in step 802, the block is read from the shared memory 31 (in step 841). The block is sent to the cache memory 300, and the data is written to the cache memory 300 (in step 842). In step 843, the state of the cache memory 300 becomes "DE", and the state of the cache memory with the "CS" state becomes "IV". Finally, the modified flag of the block in the directory 200 becomes "modified" (e.g., "1") (in step 844).

When none of the cache memories 310–330 has a copy of the block in step 802, the valid flag in the directory 200 becomes "valid" (e.g., "1"), and the modified flag in the directory 200 becomes "modified" (e.g., "1") (in step 850). Then, the operation (SUB_2) defined in FIG. 13 is executed (in step 860).

Figure 13:
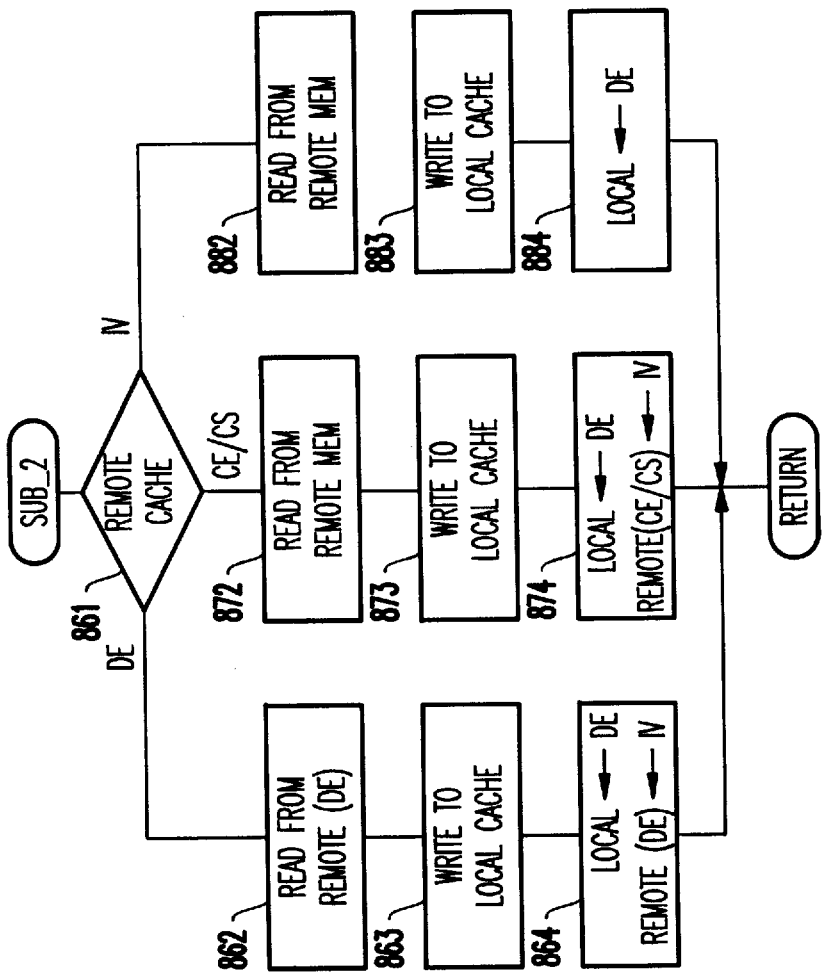
FIG. 13 is a flowchart showing an operation for writing data assigned to a remote shared memory in the clustered multi-processor system according to the first embodiment of the present invention, when the data is not copied by any cache memories.

Referring to FIG. 13, the states of the cache memories 340–370 in the cluster 2 are checked (in step 861).

If one of the cache memories 340–370 has the block with the "DE" state in step 861, the block is read from the cache memory with the "DE" state (in step 862). The block is sent to the cache memory 300, and the data is written to the cache memory 300 (in step 863). The block is registered in the cache memory 300 with the state of "DE" (in step 864). The state of the block with the "DE" state becomes "IV" (in step 864).

If any of the cache memories 340–370 have the block with the "CE" state or the "CS" state in step 861, the block is read from the shared memory 31 (in step 872). The block is sent to the cache memory 300, and the data is written to the cache memory 300 (in step 873). In step 874, the block is registered in the cache memory 300 with the state of "DE", and the state of the block with "CE" or "CS" becomes "IV".

If none of the cache memories 340–370 have a copy of the block in step 861, the block is read from the shared memory 31 (in step 882). The block is sent to the cache memory 300. Thereafter, the data is written to the cache memory 300 (in step 883). The block is registered in the cache memory 300 with the state of "DE" (in step 884).

Next, referring to FIGS. 1 and 7, the operation of an address coincidence detection and a cancellation in the multi-processor system in accordance with the above-mentioned embodiment of the present invention will be described.

The directory 100 issues a request to the system bus 40 at timings of the phases "AD0" and "AD1" of the system bus 40. If no other request is transferred from the directory 200, the directory 100 does not cancel the request.

The directory 200 transfers a request to the directory 100 at timings of the phases "AR1" and "RQ" of the system bus 41. Assuming that the request transfers required 1.5 clocks (e.g., a 1.5 phase), this request is received by the directory 100 at timings of the phases "AD1" and "AR1" of the system bus 40. Simultaneously, the directory 100 receives the request issued to the system bus 40 at timings of the phases "AD1" and "AR1" of the system bus 40.

As a result, the address coincidence detector 103 compares an address of the request from the system bus 40 with an address of the request from the directory 200 at a timing of the phase "AR1" of the system bus 40. When the address coincidence detector 103 detects coincidence, the address coincidence detector 103 notifies the coincidence (e.g., outputs a coincidence signal) to the cancel signal generator 104.

Upon receipt of the output from the address coincidence detector 103, the cancel signal generator 104 issues a "cancel" signal to the system bus 40 at a timing of the next phase "RQ" of system bus 40.

Assuming that the cache memory 300 issued the request to the system bus 40, the "cancel" signal appearing on the system bus 40 is detected by the retry controller 303. The retry controller 303 instructs the cache memory controller 302 to retry the request. The cache memory controller 302 invalidates the first-sent request, and again issues the same request in the next time period and the subsequent time periods of the system bus 40.

Since the system buses 40 and 41 are controlled by having their timings shifted by a 2.5 phase (e.g., 2.5 clocks therebetween) from each other, the request between the directories 100 and 200 does not pass through the signal lines 105 and 106 (see FIG. 3) at the same time and no conflict or delay is encountered thereby. The address coincidence is reliably and positively detected by the address coincidence detector 103.

In other words, the timings and the locations of the address coincidence detection are alternately performed in cluster 1 and cluster 2 such that the address coincidence is first detected in the directory 100 at a timing of the phase "AR1" of the system bus 40, then the address coincidence is secondly detected in the directory 200 at a timing of the phase "AR1" of the system bus 41, then the address coincidence is thirdly detected in the directory 100 at a timing of the phase "AR1" of the system bus 40, and so on. Thus, the address coincidence detector 103 detects the coincidence exclusively at the same time and there is no overlapping of detection and coherency errors are prevented.

Consequently, a specific and dedicated hardware mechanism is not required, as in the conventional systems, for holding the addresses of the requests issued from the two clusters.

Such a request which has been issued to the system bus 40 and which will be transferred to the cluster 2 is transferred to the cluster 2 without any waiting state being required unless the address coincidence is detected by the address coincidence detector 103. This request is issued on the system bus 41 as soon as the directory 2 acquires the system bus 41. Thus, system performance is increased as compared to the conventional systems.

As known by one of ordinary skill in the art taking the present application as a whole, the underlying concept of the present invention is applicable to other arrangements in which a total number of the processors is different from that of the above-described embodiment, and also a total number of the cache memories is different from that of the above embodiment.

As is apparent from the above description, according to the present invention, since no full cross-bar switch is required for connecting a plurality (e.g., two) of clusters together, the system hardware is dramatically reduced.

Moreover, a control operation is executed so that the same memory block can be shared among a plurality of cache memories not only within the clusters, but also outside the clusters. Hence, intra-cluster and inter-cluster sharing of blocks occurs. Thus, the hit ratio of the cache memories is increased, and the performance of the entire multi-processor system is significantly improved over that of the conventional systems.

Furthermore, since a specific and dedicated hardware mechanism for preventing the request from passing between the clusters is not required, the control mechanism is simplified as compared to the conventional system.

While the invention has been described in terms of a preferred embodiment, those skilled in the art will recognize that the invention can be practiced with modification within the spirit and scope of the appended claims.

For example, while the phase of 2.5 clocks between the first and second system buses has been described above, the phase may be any predetermined phase so long as the designer's requirements and constraints are met.

What is claimed is:

1. A multi-processor system having a plurality of clusters including at least one processor, at least one cache memory, a shared memory, and a system bus for connecting said at least one cache memory and said shared memory, said multi-processor system comprising:

a synchronization controller for shifting clocks of clusters of said plurality of clusters in relation to one another such that the clock of a first cluster of said plurality of clusters is separated in time from a clock of a second cluster of said plurality of clusters; and a directory for transferring requests and data among said clusters of said plurality of clusters, wherein said synchronization controller includes:

a delay circuit for delaying a signal associated with said system bus to produce a delayed signal; and a selector for selecting one of the signal associated with said system bus and the delayed signal from said delay circuit.

2. The multi-processor system according to claim 1, wherein said shared memory includes blocks, and wherein said directory manages a state of said blocks of said shared memory.

3. The multi-processor system according to claim 1, wherein said directory includes means for detecting an address coincidence of a first request in a first cluster with a second request output by a second cluster alternately among said clusters of said plurality of clusters.

4. A multi-processor system having a plurality of clusters, each of said clusters comprising:

at least one processor;

at least one cache memory connected to said at least one processor;

a shared memory coupled to said at least one cache memory;

a first system bus for connecting said at least one cache memory and said shared memory;

a directory for transferring requests and data among other clusters of said plurality of clusters; and a synchronization controller for shifting a clock of said first system bus in relation to a clock of a second system bus in a second cluster of said plurality of clusters such that the clock of said first system bus is generated in time from the clock of said second system bus, wherein said synchronization controller includes:

a delay circuit for delaying a signal associated with said first system bus to produce a delayed signal; and a selector for selecting one of the signal associated with said first system bus and the delayed signal from said delay circuit.

5. The multi-processor system according to claim 4, wherein said synchronization controller includes a counter for counting a clock of said first system bus.

6. The multi-processor system according to claim 4, wherein said synchronization controller includes a synchronization check circuit for checking whether said clock of said first system bus is shifted from said clock of said second system bus in said second cluster.

7. The multi-processor system according to claim 4, wherein said directory includes a directory memory for storing addresses of blocks of said shared memory, said blocks being copied by any cache memories in other clusters of said plurality of clusters.

8. The multi-processor system according to claim 7, wherein said directory memory stores a first flag indicating whether a corresponding block is modified by any of said cache memories in said other clusters of said plurality of clusters.

9. The multi-processor system according to claim 7, wherein said directory further includes a directory controller for transferring a request between said first system bus and a second cluster of said plurality of clusters, and updating said directory memory.

10. The multi-processor system according to claim 4, wherein said directory includes an address coincidence detector for detecting whether a first address of a first request on said system bus is coincident with a second address of a second request from a second cluster.

11. The multi-processor system according to claim 10, wherein said address coincidence detector of said first cluster detects coincidence one at a time without any overlap with an address coincidence detector of said second cluster.

12. The multi-processor system according to claim 10, wherein said directory further includes a cancel signal generator for generating a cancel signal when said address coincidence detector detects coincidence.

13. The multi-processor system according to claim 12, wherein each of said cache memory includes a retry controller for canceling said first request, and issuing a retry request when said cancel signal generator generates the cancel signal.

14. The multi-processor system according to claim 4, wherein said synchronization controller includes:

a delay circuit for delaying a signal associated with said first system bus to produce a delayed signal; and a selector for selecting one of the signal and the delayed signal from said delay circuit.

15. The multi-processor system according to claim 4, wherein said synchronization controller includes a counter for counting a clock of said first system bus.

16. The multi-processor system according to claim 4, wherein said synchronization controller includes a synchronization check circuit for judging whether said clock of said first system bus is shifted from said clock of said second system bus in a second cluster of said plurality of clusters.

17. The multi-processor system according to claim 4, wherein said synchronization controller shifts said clock of said first cluster to have a predetermined phase in relation to said clock of said second cluster.

18. A method of controlling a multiprocessor system having a plurality of clusters, each of said clusters including at least one processor, at least one cache memory coupled to said at least one processor, a shared memory, and a system bus for connecting said at least one cache memory and said shared memory, said method comprising:

shifting a clock of respective clusters of said plurality of clusters in relation to one another such that respective clocks of said respective clusters are generated in time; and detecting whether a first address of a first request from a first cluster is coincident with a second address of a second request from a second cluster, wherein said step of shifting includes:
   delaying a signal associated with said system bus to produce a delayed signal; and
   selecting one of the signal associated with said system bus and the delayed signal.

19. The method of controlling the multi-processor system according to claim 18, said method further comprising steps of:
   canceling said first request; and
   reissuing said first request when coincidence is detected in said detecting step.

20. The multi-processor system according to claim 1, wherein said synchronization controller shifts a clock of a first cluster to have a predetermined phase in relation to a clock of a second cluster.

21. The method of controlling the multi-processor system according to claim 18, in said shifting step, a clock of said first cluster being shifted to have a predetermined phase in relation to a clock of said second cluster.

* * * * *